United States Patent [19]

Gaspar

[11] 4,081,788
[45] Mar. 28, 1978

[54] CONCEALED EMERGENCY SIGNALING DEVICE

[76] Inventor: Arturo S. Gaspar, 902 Watson, Wilmington, Calif. 90744

[21] Appl. No.: 646,525

[22] Filed: Jan. 5, 1976

[51] Int. Cl.² ............................ G08B 5/00; G08B 7/00
[52] U.S. Cl. ...................................... 340/137; 340/87; 340/84; 340/88; 116/40
[58] Field of Search .................. 340/84, 87, 137, 136; 240/7.1 H, 7.35, 54 A; 116/40

[56] References Cited

U.S. PATENT DOCUMENTS

| | | | |
|---|---|---|---|
| 1,467,173 | 9/1923 | Kennedy | 116/40 |
| 2,918,566 | 12/1959 | Lunsford | 340/87 |
| 2,924,811 | 2/1960 | Popkess et al. | 340/87 |
| 3,107,865 | 10/1963 | Hostetter | 240/7.1 H |
| 3,264,607 | 8/1966 | Sherman | 340/87 |
| 3,404,371 | 10/1968 | Gosswiller | 340/88 |
| 3,579,184 | 5/1971 | Forestal | 340/137 |
| 3,783,267 | 1/1974 | Thomas | 340/87 |

*Primary Examiner*—John W. Caldwell, Sr.
*Assistant Examiner*—Donnie L. Crosland
*Attorney, Agent, or Firm*—Fulwider, Patton, Rieber, Lee & Utecht

[57] ABSTRACT

An emergency signal device adapted for concealed mounting in the roof of a vehicle thereby providing a secret light is disclosed. The device comprises a housing of a generally open-top, box construction adapted to be mounted in an opening in a roof of a vehicle and receiving an emergency signal enclosure that has a top plate having a contour conforming to the roof line of the vehicle and a span sufficient to overlie the peripheral edges of the box housing whereby the assembly is secured in a weather tight configuration in its retracted position. The assembly also includes an extensible mechanism in the form of a pair of arms interconnected at their midportions and mechanically linking the emergency signaling enclosure and the housing with at least one free end of each of the pairs of arm assemblies being in sliding connection to its respective enclosure or housing whereby the enclosure can be raised to an elevated position entirely without the housing and at a substantial spaced position above the roof of the vehicle. Optional variations of the invention include folding skirt means extending between the enclosure and the housing whereby the extensible mechanism is enclosed. Preferably, the emergency signaling enclosure carries a plurality of emergency lights such as flashing beacons and the like each of which is mounted in a separate chamber of a multichambered enclosure.

8 Claims, 7 Drawing Figures

U.S. Patent  March 28, 1978  4,081,788
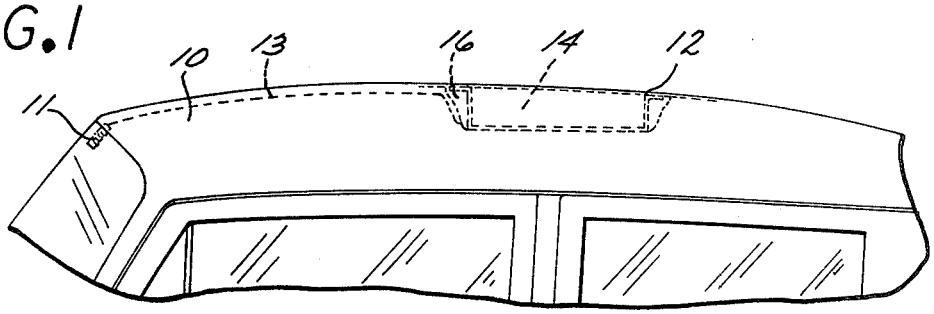
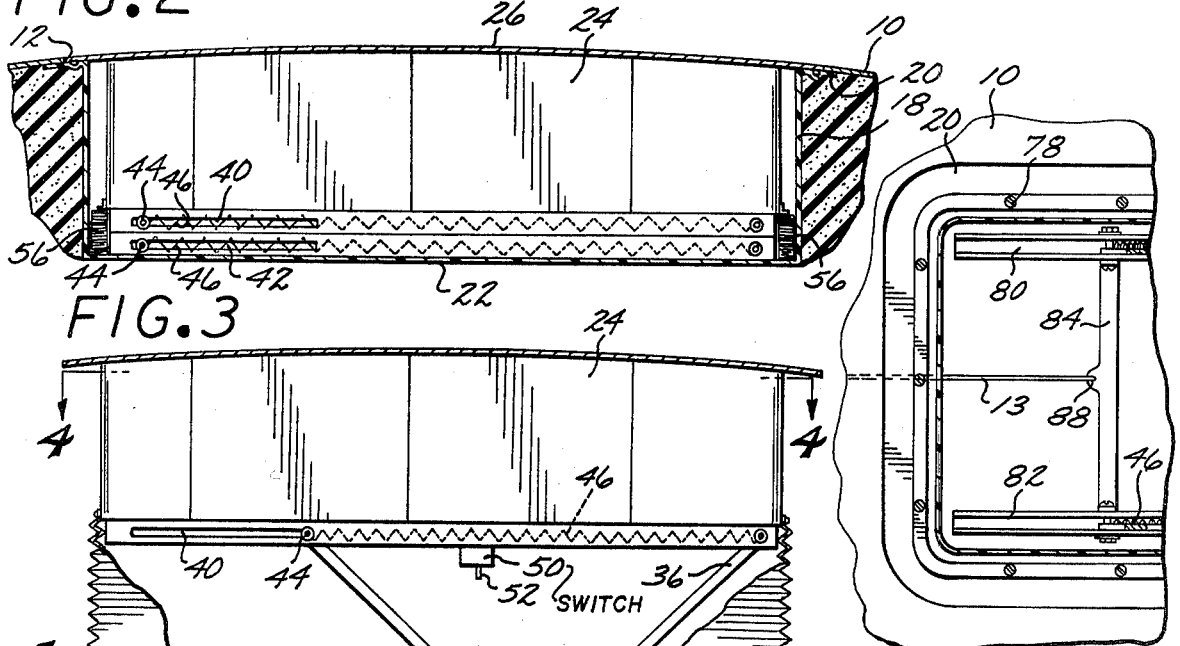
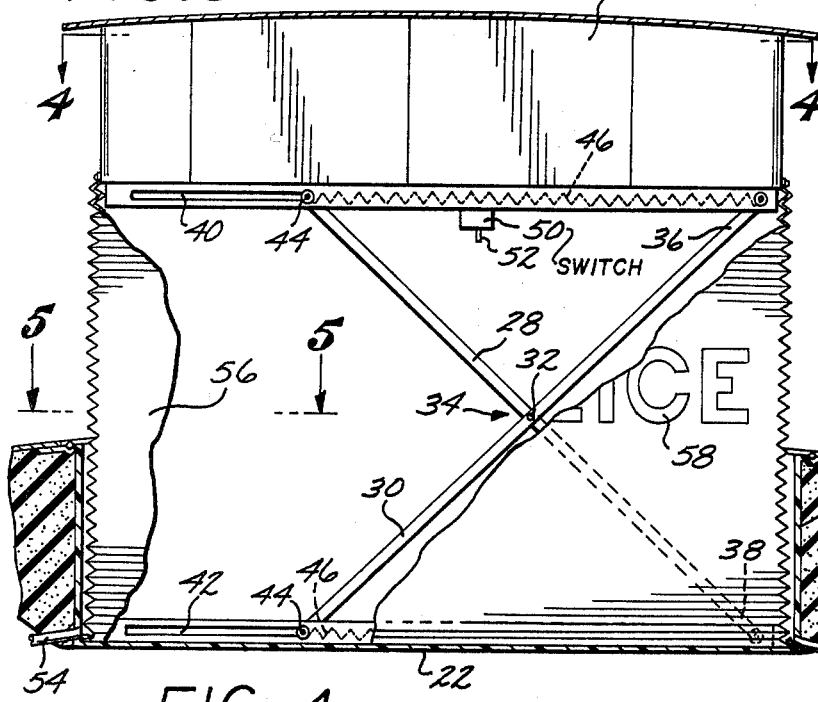
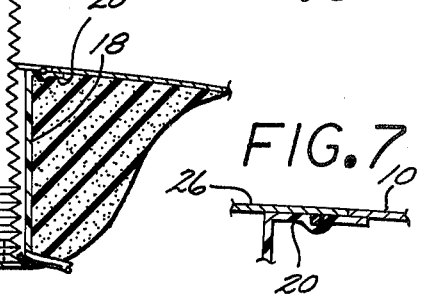
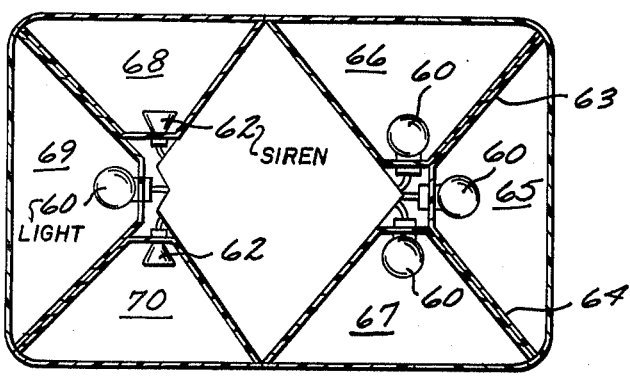
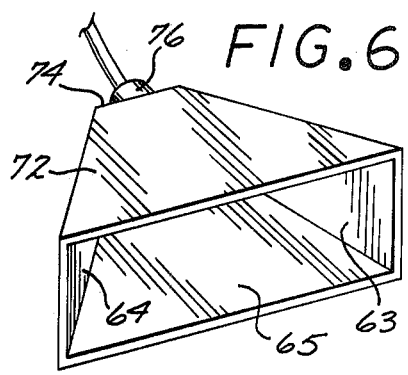

CONCEALED EMERGENCY SIGNALING DEVICE

BACKGROUND OF THE INVENTION

1. Field of Invention

This invention relates to emergency signaling devices and, in particular, to an emergency signaling device for use on municipal vehicles.

2. Brief Statement of the Prior Art

Municipal vehicles such as police, fire and street department automobiles, trucks and the like must often carry emergency signaling devices for warning or arresting other traffic. These emergency warning devices are often bulky and cumbersome and are conspicuously mounted on the roof of the vehicle, preventing concealment of the purpose of the vehicle. Typical of these is the arresting light structure commonly carried on police patrol vehicles. When such a structure is permanently installed on a vehicle it prevents the employment of the vehicle for surveillance duty where the identity of the vehicle must be disguised. Even when emergency and arresting facilities are temporarily mounted on the roof of the vehicle, they attract an undesirable amount of attention and effectively prohibit disguising of the traffic patrol vehicle.

Various attempts have been made to conceal emergency signaling devices such as the concealed beacon disclosed in U.S. Pat. No. 3,264,607. The patented beacon has a limited freedom of movement and cannot be elevated any substantial distance above the roof line of the vehicle. Another attempt to provide a folding emergency signaling device is shown in U.S. Pat. No. 3,579,184 where the emergency signaling lights are carried in a box which is mounted on the rooftop of the vehicle and which is not concealed from view. This device employs a complex lazy tongs elevating mechanism that is too bulky for concealment.

It is, therefore, desirable to provide an emergency signaling device in an assembly that can be mounted totally within the roof line of a vehicle thereby concealing the otherwise conspicuous alarm devices. It is likewise desirable to provide such an assembly with a substantial vertical travel whereby the emergency signaling mechanism can be lifted totally without the vehicle and supported at a substantially elevated, spaced apart position from the vehicle roof line.

Other and related objectives will be apparent from the following description of the invention.

BRIEF DESCRIPTION OF THE INVENTION

This invention comprises an emergency signaling device adapted for concealed mounting within the roof line of a vehicle and the assembly of the signaling device to a vehicle. Briefly, the emergency signaling device includes a housing of a generally open-top box construction adapted for mounting within a cut out cavity in the roof of the vehicle and a lip extending about the periphery of the upper edge of the housing which can be secured to the roof of the vehicle. The device also includes an emergency signal enclosure that is received within the open-top housing and that bears an upper or top cover plate having a contour conforming to the roof line of the vehicle in which the device is mounted and having a sufficient span of width and breath to overlie the joint between the housing and vehicle roof whereby the device is entirely concealed within the roof of the vehicle when in its retracted position. The device also includes an extendable mechanism for raising and lowering of the enclosure between its retracted and totally received position within the housing to an elevated, totally without, position where the enclosure is supported at a substantial, spaced-apart position above the roof of the vehicle.

Preferred embodiments of the invention include a folding skirt of a flexible fabric and the like that extends between the enclosure and housing and totally encircles the device and lifting mechanism. Other embodiments of the invention include switch means carried by the housing or enclosure and operative upon movement of the enclosure from its retracted position to actuate the emergency signaling facilities and to deactivate such facilities when the enclosure moves into its retracted position. The enclosure is preferably multichambered with each chamber housing one of a plurality of emergency signaling devices such as flashing beacons and the like.

BRIEF DESCRIPTION OF THE DRAWINGS

The invention will be described with reference to the illustrated and presently preferred embodiment thereof shown in the figures of which:

FIG. 1 illustrates a roof of a vehicle equipped with the invention;

FIG. 2 is an elevation sectional view of the invention in its retracted position;

FIG. 3 is an elevation sectional view of the invention in its raised position;

FIG. 4 is a sectional plan view of the emergency signaling enclosure of the invention;

FIG. 5 illustrates the extendable assembly in its raised position;

FIG. 6 illustrates one of the multiple chambers within the preferred emergency signaling enclosure; and FIG. 7 illustrates mounting of the housing of the device to the roof of a vehicle.

DESCRIPTION OF PREFERRED EMBODIMENT

Referring now to FIG. 1, there is illustrated roof 10 of a conventional motor vehicle such as a passenger car and the like. The invention is employed in combination with such a vehicle by cutting an opening 12 into the roof of the vehicle, preferably at a midportion thereof as illustrated such that the device fits between the front and rear seat occupants, thereby minimizing the effect of its intrusion into the vehicle. The device is shown in FIG. 1 in its retracted position by the hidden object lines which generally define a boxlike housing 14 which is surrounded within the passenger compartment, by layers 16 of cushioning material such as foam rubber, polyurethane foam, and the like. An operator's hand lever 11 can be attached to the interior roof with a rod 13 extending to the device.

FIGS. 2 and 3 illustrate the emergency warning device of the invention in greater detail. As there illustrated, the opening 12 in the roof 10 of the vehicle receives an open-top box housing 18 bearing a lip 20 about its upper peripheral edge which is secured to the roof 10 of the vehicle by an adhesive, welding, riveting, etc. The housing 18 has a closed bottom with a bottom wall 22 and is surrounded by the aforementioned layers 16 of cushioning material. Received within housing 18 is the emergency signal enclosure 24 which has a top wall 26 of sufficient width and breath dimensions to span, entirely, the open end of housing 18 and to overlie the peripheral lip 20. The top plate 26 bears the same contour as the roof 10 to provide a smooth continuity between the roof and the emergency signaling device of the invention, thereby rendering the device relatively inconspicuous.

The extendable mechanism to effect elevation of the emergency signal enclosure 24 comprises a pair of arms 28 and 30 which are pivotally interconnected at their midpoints by pin 32 at each side of the assembly. The pair 34 of arms 28 and 30 are mechanically connected between the emergency signal enclosure 24 and a lower portion of housing 18. To this end, ends 36 and 38 of arms 30 and 28 respectively are pivotally connected, one each to the enclosure and housing and the opposite or free ends of these arms are in sliding connection to the respective ones of the enclosure and housing. The sliding connection includes parallel slots 40 and 42 in each of the enclosure and housing with a pin such as 44 interconnecting the ends of the arms to the slots. The pins 44 are preferably also engaged by tension spring means 46 which extend to the opposite end of the enclosure and of the housing whereby the extendable assemblies are resiliently biased into the raised position shown in FIG. 3.

As shown in FIG. 3, the assembly also includes switch means 50 in the form of a microswitch and the like having a switch lever 52 which extends into bearing contact against the bottom wall 22 of housing 18 when the enclosure 24 is in the retracted position shown in FIG. 2. The switch 50 is employed in the activating circuit to the emergency signaling means contained within enclosure 24 such that the raising of the enclosure and movement of the enclosure out of housing 18 is sufficient to actuate the emergency alarm signals by closing of the electrical circuit to the signals.

Housing 18 is also preferably provided with drain means in the form of conduits 54 which can be positioned at one or more low points of the housing. Preferably, the assembly includes folding skirt means 56 formed of a flexible fabric and the like which extends entirely about the bottom periphery of enclosure 24 and about the inside wall of housing 18, thereby forming an enclosure which contains the extensible assemblies of pairs 34 of lift arms 30. If desired, the skirt 56 can bear indicia to indicate the identity of the vehicle to observers.

Various emergency signal devices can be incorporated within enclosure 24. Typical of suitable signal devices include one or more of visible light sources such as flashing beacons 60 and the like as well as audible alarm means such as siren generators 62 and the like. In the preferred embodiment, enclosure 24 is a multichambered enclosure defined by a plurality of internal walls such as 63 and 64 that subdivide the compartment into a plurality of compartments 65–70, each of which can house a separate and independently actuated alarm means or, if desired, all of the alarm means can be actuated by a single switch such as switch means 50.

FIG. 4 illustrates a typical interior compartment 72 for enclosure 24. This compartment 72 defines chamber 65 and is formed by the inclined and opposite side walls 63 and 64 in the form of a truncated, rectangular-base pyramid with the short wall 74 bearing the emergency alarm means in the form of a socket 76 for mounting of a flashing beacon such as 60.

Referring now to FIGS. 5 and 7, the extendable lift assembly will be described in greater detail. As there illustrated, the housing is secured to roof 10 of the vehicle with the peripheral upper lip 20 extending and overlying the cutout in the roof. A plurality of fasteners such as rivets 78 and the like extend through the peripheral lip and the roof of the vehicle. Track means such as open channels 80 and 82 are positioned longitudinally along the undersurface of the emergency signal enclosure 24 and the bottom wall of the housing 18 to slidably receive the free ends of the arms such as 28 and 30 of the extendable arm assemblies 34 which are located at opposite sides of the device. The free ends of these arms are preferably interconnected by cross bar member 84 which is also slidably carried in the open channels 80 and 82. The resilient tension springs 46 are interconnected to the arm 84 to urge the extendable assemblies such as 34 into the elevated position, raising enclosure 24 without housing 18 and into its elevated and spaced-apart position, a substantial distance above roof 10 of the vehicle.

The rod 13 is extended through a forward wall of housing 18 and into a pinned connection 88 to crossbar 84. This rod 13 can extend to suitable actuating means such as hand lever 11 or an electric motor mechanism within the vehicle whereby the rod can be slidably moved in a longitudinal direction to advance crossbar 84 against the bias of springs 40, retracting the assembly to the position shown in FIG. 2.

The invention has been described with reference to the presently preferred and illustrated embodiment thereof. It is not intended that the invention be unduly limited by the disclosure of the presently preferred embodiment. Instead, it is intended that the invention be defined by the means, and their obvious equivalent set forth in the following claims.

What is claimed is:

1. A concealed emergency light assembly for mounting in the roof of a vehicle which comprises:
    a generally flat, rectangular, open-top housing extending transversely of said vehicle and having a peripheral lip about its top edge for securing to the roof panel of said vehicle;
    emergency signal enclosure means received within said housing and having transparent side walls and a top closure plate having a span to overlie said peripheral lip of said housing and a bowed contour following the roof contour of said vehicle;
    emergency signal means including a plurality of spaced-apart signal devices extending transversely of said vehicle within said enclosure; and
    enclosure lift means including an extendable assembly of a pair of arm members mounted one each at opposite sides of said assembly, longitudinally of said vehicle, and joined together in a pivotal connection at an intermediate point of their length and having at least one end of each of said pairs of said members in sliding connection to respective ones of the side walls of said enclosure and said housing and operative to elevate said enclosure from a received position totally within said housing to a raised position entirely without and elevated above said housing and the roof of said vehicle.

2. The emergency signal assembly of claim 1 including a pair of open channel track means longitudinally carried by the undersurface of said enclosure and the bottom wall of said housing to slidably receive at least one end of said pairs of arm members.

3. The emergency signal assembly of claim 1 including folding skirt means carried by the bottom side wall of said emergency signal enclosure and extending to said housing to enclose said extendable assembly.

4. The emergency signal assembly of claim 1 including drain means in said housing.

5. The emergency signal assembly of claim 1 wherein said emergency signal means includes a plurality of flashing light means.

6. The emergency signal means of claim 5 wherein said enclosure is multichambered and the chambers thereof receive one of said flashing light means.

7. The emergency signal means of claim 6 also including at least one alarm means in each chamber of said enclosure.

8. The emergency signal means of claim 1 including switch means carried by one of said housing and enclosure and operative to engage the other of said enclosure and housing when said enclosure is moved into its retracted position to open said switch means.

* * * * *